United States Patent
Nakagawa et al.

(10) Patent No.: US 9,261,705 B2
(45) Date of Patent: Feb. 16, 2016

(54) DISPLAY DEVICE AND DISPLAY SYSTEM

(75) Inventors: Makoto Nakagawa, Tokyo (JP); Tsuyoshi Kamada, Kanagawa (JP); Yuji Nakahata, Kanagawa (JP)

(73) Assignee: Sony Corporation, Tokyo (JP)

(*) Notice: Subject to any disclaimer, the term of this patent is extended or adjusted under 35 U.S.C. 154(b) by 965 days.

(21) Appl. No.: 12/800,433

(22) Filed: May 14, 2010

(65) Prior Publication Data

US 2010/0309297 A1    Dec. 9, 2010

(30) Foreign Application Priority Data

Jun. 9, 2009   (JP) .............................. P2009-138428

(51) Int. Cl.
    H04N 13/04    (2006.01)
    G02B 27/22    (2006.01)

(52) U.S. Cl.
    CPC ........ G02B 27/2264 (2013.01); H04N 13/0438 (2013.01); *H04N 2013/0463* (2013.01)

(58) Field of Classification Search
    None
    See application file for complete search history.

(56) References Cited

U.S. PATENT DOCUMENTS

| | | | | |
|---|---|---|---|---|
| 5,717,412 | A * | 2/1998 | Edwards | 345/7 |
| 8,085,217 | B2 * | 12/2011 | Slavenburg et al. | 345/8 |
| 2002/0122585 | A1 * | 9/2002 | Swift et al. | 382/154 |
| 2004/0233275 | A1 * | 11/2004 | Tomita | 348/51 |
| 2007/0229395 | A1 | 10/2007 | Slavenburg et al. | |
| 2008/0043203 | A1 * | 2/2008 | Jacobs et al. | 352/63 |
| 2009/0051759 | A1 * | 2/2009 | Adkins et al. | 348/53 |

FOREIGN PATENT DOCUMENTS

| | | | |
|---|---|---|---|
| JP | 09-138384 A | | 5/1997 |
| JP | 2000-004451 A | | 1/2000 |
| JP | 2001075045 A | * | 3/2001 |
| JP | 2001258052 A | | 9/2001 |
| JP | 2005522958 A | | 7/2005 |
| JP | 2006115198 A | * | 4/2006 |
| JP | 2007163701 A | | 6/2007 |
| JP | 2007279717 A | | 10/2007 |
| JP | 2008072699 A | | 3/2008 |
| JP | 2008153219 A | | 7/2008 |
| JP | 2008245293 A | | 10/2008 |
| WO | WO 2007116549 A1 | * | 10/2007 |
| WO | WO 2008056753 A1 | * | 5/2008 |
| WO | 2009/069026 A2 | | 6/2009 |

OTHER PUBLICATIONS

Pastoor, Human Factors of 3D Imaging: Results of Recent Research at Heinrich-Hertz-Institut Berlin, Oct. 19, 1995, Proceedings of the 2nd International Display Workshops, pp. 69-72.*
European Search Report EP 10164577, dated Aug. 18, 2010.
Office Action from Japanese Application No. 2009-138428, dated Oct. 24, 2012.
Office Action from Chinese Application No. 2012-10362117.5, dated May 4, 2014.

* cited by examiner

*Primary Examiner* — Mehrdad Dastouri
*Assistant Examiner* — James M Anderson, II
(74) *Attorney, Agent, or Firm* — Sony Corporation (57) ABSTRACT

Disclosed herein is a display device, including: a display unit configured to display images each corresponding to a respective one of a plurality of shutter mechanisms that carry out opening and closing operation at timings different from each other, in such a manner as to switch the images in a time-division manner; and a shutter controller configured to set a respective one of the shutter mechanisms to an opened state in a display period of the image corresponding to the respective one of the shutter mechanisms, and variably control at least one of start time and length of an opened-state period of the shutter mechanism.

12 Claims, 11 Drawing Sheets

FIG.8A
SCREEN UPPER PART

FIG.8B
SCREEN CENTER PART

FIG.8C
SCREEN LOWER PART

FIG.10A

RIGHT-EYE IMAGE

FIG.10B

LEFT-EYE IMAGE

DISPLAY DEVICE AND DISPLAY SYSTEM

CROSS-REFERENCE TO RELATED APPLICATION

The present application claims priority from Japanese Patent Application No. JP 2009-138428 filed in the Japanese Patent Office on Jun. 9, 2009, the entire content of which is incorporated herein by reference.

BACKGROUND OF THE INVENTION

1. Field of the Invention

The present invention relates to a display system employing shutter eyeglasses and a display device suitable to be used in such a system.

2. Description of the Related Art

In recent years, an active-matrix liquid crystal display (LCD) device in which a thin film transistor (TFT) is provided for each pixel is frequently used as the display of flat-screen televisions and portable terminal devices. In such a liquid crystal display device, generally the respective pixels are driven by line-sequential writing of the video signal in the direction from the screen upper part toward the lower part.

In the liquid crystal display device, depending on the use purpose thereof, driving in which the one-frame period is multiple-divided and a different image is displayed on each divided time basis (hereinafter, referred to as the time-division driving) is carried out. Examples of the liquid crystal display device based on such a time-division driving system include a liquid crystal display device based on the field sequential system and a stereoscopic display system employing shutter eyeglasses (refer to e.g. Japanese Patent Laid-open No. 2000-4451 (hereinafter, Patent Document 1)).

In the stereoscopic display system employing shutter eyeglasses, the one-frame period is divided into two periods, and two images having parallax therebetween are displayed as a left-eye image and a right-eye image in such a manner as to be alternately switched. Furthermore, shutter eyeglasses that carry out opening and closing operation in synchronization with this display switching are used. The shutter eyeglasses are so controlled that the left eye side is opened (the right eye side is closed) during the display period of the left-eye image whereas the right eye side is opened (the left eye side is closed) during the display period of the right-eye image. The viewer wearing such shutter eyeglasses views the displayed images, which realizes stereoscopic vision.

SUMMARY OF THE INVENTION

However, in the above-described stereoscopic display system, interference (hereinafter, referred to as crosstalk) occurs between consecutive images because of reasons relating to the characteristics of the display device and the shutter, such as insufficiency of the response speed in the liquid crystal display device and insufficiency of the contrast in the shutter eyeglasses. For example, a phenomenon that part of the left-eye image is leaked into the right eye and part of the right-eye image is leaked into the left eye occurs.

To address this problem, in the technique disclosed in Patent Document 1, the light-blocking period during which both of the left eye side and the right eye side are simultaneously set to the light-blocking state is provided for the shutter eyeglasses. This can suppress the occurrence of the crosstalk although lowering the luminance.

However, in such a case, the start time (hereinafter, referred to simply as the timing) and length (duty) of the opened-state period in the shutter eyeglasses are set as fixed values in advance based on e.g. the screen center part, and cannot be changed after the product shipment. In the case of the above-described line-sequential writing in the direction from the screen upper part toward the lower part, difference in the time until the luminance reaches the target luminance occurs between the screen upper part and lower part. Thus, for example, if the timing and duty of the shutter-opened period are set based on the screen center part, deviation from the target luminance occurs at the screen upper part and lower part, and the crosstalk easily occurs. That is, depending on the position in the screen, the optimum timing and duty of the shutter-opened period for suppressing the crosstalk differ.

Consequently, if the timing and duty of the shutter-opened period are fixed like in the technique disclosed in Patent Document 1, it is impossible to set the optimum timing and duty of the shutter-opened period in matching with the content of the image. In addition, it is also impossible to respond to various needs of the user at the time of the use of the display device, such as the need to give priority to luminance enhancement over reduction in the crosstalk and the need to, adversely, reduce the crosstalk although the luminance is somewhat lowered. Therefore, it is desired to realize a display device capable of suppressing the crosstalk depending on the content of the image and the status of use.

There is a need for the present invention to provide a display device and a display system that are capable of suppressing crosstalk depending on the content of the image and the status of use.

According to an embodiment of the present invention, there is provided a display device including a display unit configured to display images each corresponding to a respective one of a plurality of shutter mechanisms that carry out opening and closing operation at timings different from each other, in such a manner as to switch the images in a time-division manner. The display device further includes a shutter controller configured to set a respective one of the shutter mechanisms to the opened state in the display period of the image corresponding to the respective one of the shutter mechanisms, and variably control at least one of the start time and length of the opened-state period of the shutter mechanism.

According to another embodiment of the present invention, there is provided a display system including a plurality of shutter mechanisms configured to carry out opening and closing operation at timings different from each other, and a display unit configured to display images each corresponding to a respective one of the plurality of shutter mechanisms in such a manner as to switch the images in a time-division manner. The display system further includes a shutter controller configured to set a respective one of the shutter mechanisms to the opened state in the display period of the image corresponding to the respective one of the shutter mechanisms, and variably control at least one of the start time and length of the opened-state period of the shutter mechanism.

In the display device and the display system according to the embodiments of the present invention, in the display period of a respective one of the images displayed with switching in a time-division manner, the shutter mechanism corresponding to this image is set to the opened state. At this time, at least one of the start time and length of the opened-state period of the shutter mechanism is changed and the opened-state periods are optimized to suppress crosstalk between consecutive images.

In the display device and the display system according to the embodiments of the present invention, the display unit displays a plurality of images in such a manner as to switch the images in a time-division manner. Furthermore, the shutter controller sets a respective one of the shutter mechanisms to the opened state in the display period of the image corresponding to the respective one of the shutter mechanisms, and variably controls at least one of the start time and length of the opened-state, period of the shutter mechanism. Thus, crosstalk can be suppressed depending on the content of the image and the status of use.

DETAILED DESCRIPTION OF THE PREFERRED EMBODIMENTS

Embodiments of the present invention will be described in detail below with reference to the drawings. The description will be made in the following order.

1. First Embodiment
(example in which the timing of the shutter-opened period is changed based on the amount of parallax)
2. Second Embodiment
(example in which the timing of the shutter-opened period is changed based on the contrast)
3. Modification Example 1
(example in which the duty of the shutter-opened period is changed based on the contrast)
4. Modification Example 2
(example in which the timing and duty of the shutter-opened period are changed in response to an input signal from the external)
5. Modification Example 3
(example in which the duty of the shutter-opened period is changed depending on the panel temperature)
6. Modification Example 4
(example of a multi-view system)

<First Embodiment>
[Entire Configuration of Display System]

Figure 1:
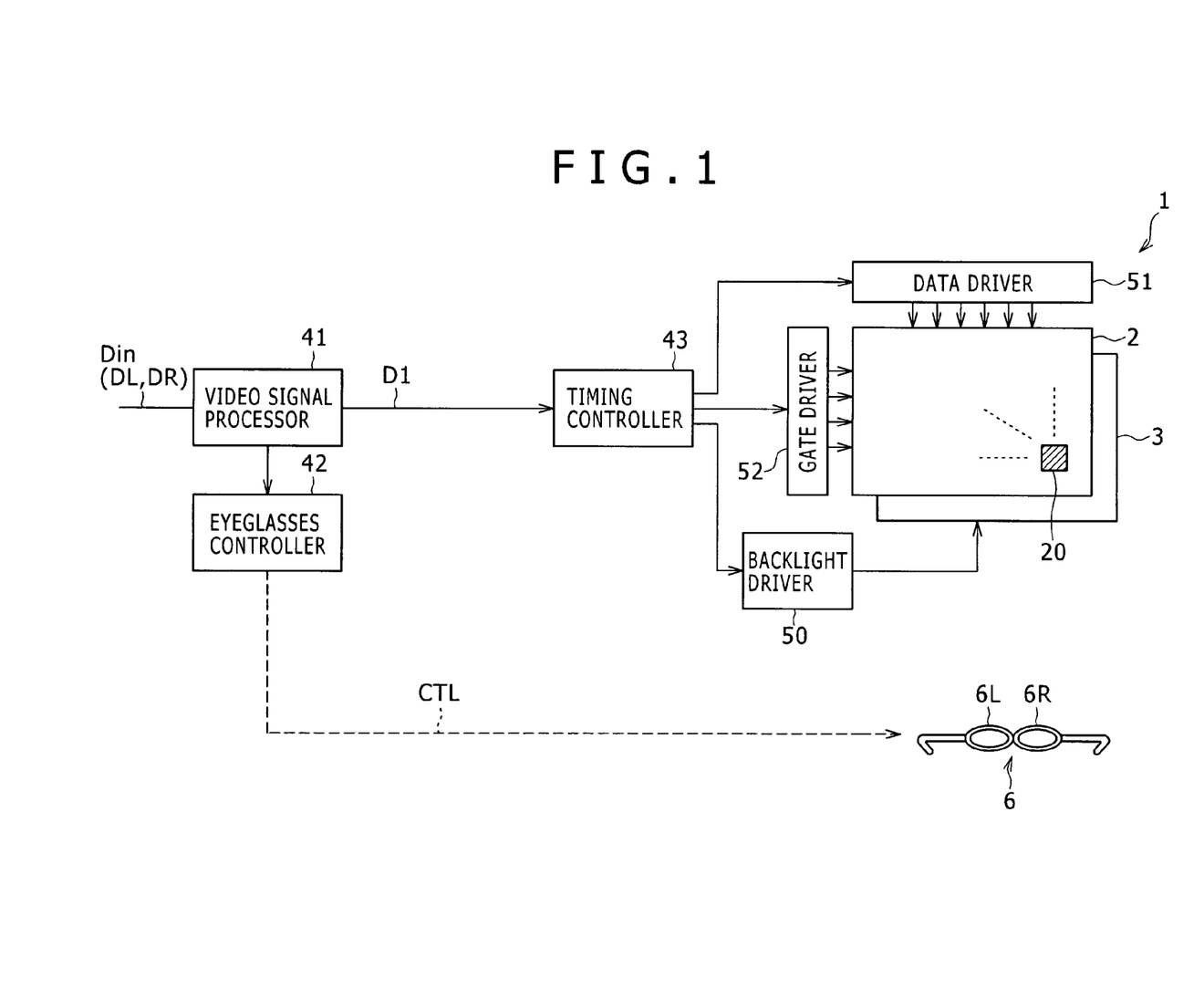
FIG. 1 is a block diagram showing the entire configuration of a display system according to a first embodiment of the present invention.

FIG. 1 is a diagram showing the block configuration of a display system according to a first embodiment of the present invention. This display system is a stereoscopic display system based on the time-division driving system and includes a display device (liquid crystal display device 1) according to the first embodiment of the present invention and shutter eyeglasses 6.

The liquid crystal display device 1 performs video displaying based on an input video signal Din including a right-eye video signal DR and a left-eye video signal DL involving lateral parallax. This liquid crystal display device 1 includes a liquid crystal display panel 2, a backlight 3, a video signal processor 41 (video processor), an eyeglasses controller 42 (shutter controller), a timing controller 43, a backlight driver 50, a data driver 51, and a gate driver 52.

The backlight 3 is a light source for emitting light to the liquid crystal display panel 2, and includes e.g. plural light emitting diodes (LEDs) or plural cold cathode fluorescent lamps (CCFLs).

The liquid crystal display panel 2 modulates the light emitted from the backlight 3 in accordance with the drive signal supplied from the gate driver 52 to be described later and based on the video voltage supplied from the data driver 51, to thereby perform video displaying based on the input video signal Din. Specifically, as described in detail later, in a one-frame period, a right-eye image based on the right-eye video signal DR and a left-eye image based on the left-eye video signal DL are alternately displayed in a time-division manner. This liquid crystal display panel 2 includes plural pixels 20 arranged in a matrix as a whole.

Figure 2:
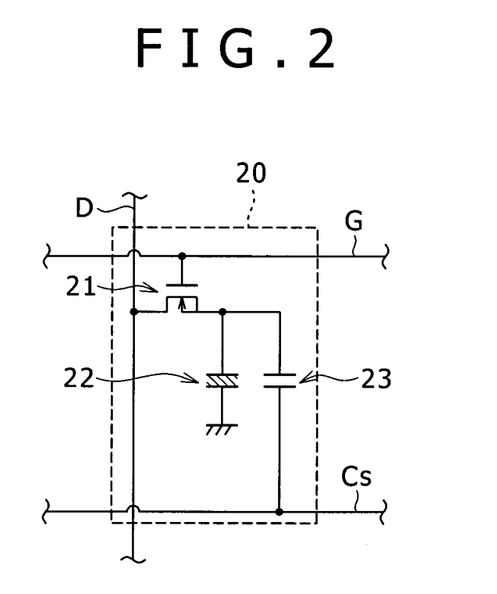
FIG. 2 is a circuit diagram showing a detailed configuration example of a pixel shown in FIG. 1.

With reference to FIG. 2, the detailed configuration of each pixel 20 will be described below. FIG. 2 is a diagram showing a circuit configuration example of the pixel circuit in each pixel 20. The pixel 20 includes a liquid crystal element 22, a thin film transistor (TFT) element 21, and an auxiliary capacitive element 23. To this pixel 20, a gate line G for line-sequentially selecting the pixel as the driving object, a data line D for supplying the video voltage (the video voltage supplied from the data driver 51) to the pixel as the driving object, and an auxiliary capacitive line Cs are connected.

The liquid crystal element 22 carries out display operation depending on the video voltage supplied from the data line D to its one terminal via the TFT element 21. This liquid crystal element 22 is formed by sandwiching a liquid crystal layer (not shown) composed of a liquid crystal of e.g. the vertical alignment (VA) mode or the twisted nematic (TN) mode by a pair of electrodes (not shown). One of the pair of electrodes (one terminal) of the liquid crystal element 22 is connected to the drain of the TFT element 21 and one terminal of the auxiliary capacitive element 23, and the other (the other terminal) is grounded. The auxiliary capacitive element is a capacitive element for stabilizing the charge accumulated in the liquid crystal element 22. One terminal of the auxiliary capacitive element 23 is connected to one terminal of the liquid crystal element 22 and the drain of the TFT element 21, and the other terminal thereof is connected to the auxiliary capacitive line Cs. The TFT element 21 is a switching element for supplying the video voltage based on a video signal D1 to one terminal of each of the liquid crystal element 22 and the auxiliary capacitive element 23, and is formed of a metal oxide semiconductor-field effect transistor (MOS-FET). The gate and source of the TFT element 21 are connected to the gate line G and the data line D, respectively, and the drain thereof is connected to one terminal of each of the liquid crystal element 22 and the auxiliary capacitive element 23.

The video signal processor 41 generates the video signal D1 by controlling the writing order (display order) of the right-eye video signal DR and the left-eye video signal DL based on the input video signal Din. In the present embodiment, the video signal D1 arising from alternate arrangement of the left-eye video signal DL and the right-eye video signal DR in the one-frame period is generated. Hereinafter, of the one-frame period, the display period of the left-eye image will be referred to as the "L sub-frame period" and the display period of the right-eye image will be referred to as the "R sub-frame period."

This video signal processor 41 can detect the amount of parallax and the contrast between the right-eye image and the left-eye image as described in detail later.

The timing controller 43 controls the drive timings of the backlight driver 50, the gate driver 52, and the data driver 51, and supplies, to the data driver 51, the video signal D1 given from the video signal processor 41. It is also possible that this timing controller 43 executes overdrive processing for the video signal D1.

The gate driver 52 line-sequentially drives the respective pixels 20 in the liquid crystal display panel 2 along the gate lines in accordance with the timing control by the timing controller 43.

The data driver 51 supplies, to each of the pixels in the liquid crystal display panel 2, the video voltage based on the video signal D1 given from the timing controller 43. Specifically, the data driver 51 carries out digital/analog (D/A) conversion for the video signal D1 to thereby generate a video signal (the above-described video voltage) as an analog signal and output it to each pixel 20.

The backlight driver 50 controls the lighting operation (light emission operation) of the backlight 3 in accordance with the timing control by the timing controller 43.

(Configurations of Eyeglasses Controller 42 and Shutter Eyeglasses 6)

The eyeglasses controller 42 outputs, to the shutter eyeglasses 6, a timing control signal (control signal CTL) corresponding to the timings of output of the right-eye video signal DR and the left-eye video signal DL by the video signal processor 41. Although this control signal CTL is shown as a wireless signal such as an infrared signal in FIG. 1, it may be a signal for wired signal.

The shutter eyeglasses 6 are used by the viewer (not shown in FIG. 1) of the liquid crystal display device 1 to thereby allow stereoscopic vision. The shutter eyeglasses 6 have a left-eye lens 6L and a right-eye lens 6R, and each of the left-eye lens 6L and the right-eye lens 6R is provided with a light-blocking shutter (not shown) such as a liquid crystal shutter. The active state (closed state) and inactive state (opened state) of the light-blocking function of these light-blocking shutters are controlled by the control signal CTL supplied from the eyeglasses controller 42.

Specifically, the eyeglasses controller 42 controls the shutter eyeglasses 6 in such a way that the opened state and closed state of the left-eye lens 6L and the right-eye lens 6R are alternately switched corresponding to the display periods of the left-eye image and the right-eye image. In other words, in the L sub-frame period, the eyeglasses controller 42 carries out control for setting the left-eye lens 6L to the opened state and setting the right-eye lens 6R to the closed state. On the other hand, in the R sub-frame period, the eyeglasses controller 42 carries out control for setting the right-eye lens 6R to the opened state and setting the left-eye lens 6L to the closed state. This makes it possible to see the right-eye image by the right eye and see the left-eye image by the left eye in the time-division driving system in which the one-frame period is divided into two periods and the right-eye image and the left-eye image are displayed with alternate switching therebetween. Each of the left-eye lens 6L and the right-eye lens 6R in the shutter eyeglasses 6 is one specific example of the "shutter mechanism" of the present invention.

In the present embodiment, such an eyeglasses controller 42 variably controls the timing (start time) of the opened-state period in the shutter eyeglasses 6. Specifically, as described in detail later, the eyeglasses controller 42 sets (changes) the timings of the respective opened-state periods of the left-eye lens 6L and the right-eye lens 6R in the shutter eyeglasses 6 based on e.g. the amount of parallax between consecutive right-eye image and left-eye image on a frame-by-frame basis for example.

[Operation and Effects of Display System]

(1. Video Display Operation of Liquid Crystal Display Device 1)

In the display system of the present embodiment, as shown in FIG. 1, in the liquid crystal display device 1, the video signal processor 41 controls the writing order of the right-eye video signal DR and the left-eye video signal DL to generate the video signal D1, based on the input video signal Din. This video signal D1 is supplied to the data driver 51 via the timing controller 43. The data driver 51 performs D/A conversion for the video signal D1 to generate the video voltage as an analog signal. Subsequently, the display driving operation is carried out by the drive voltages output from the gate driver 52 and the data driver 51 to the respective pixels 20.

Specifically, as shown in FIG. 2, the on/off-operation of the TFT element 21 is switched in response to the selection signal supplied from the gate driver 52 via the gate line G. Thereby, conduction between the data line D and the liquid crystal element 22 and the auxiliary capacitive element 23 is selectively established. As a result, the video voltage based on the video signal D1 supplied from the data driver 51 is supplied to the liquid crystal element 22, so that the line-sequential display driving operation is carried out. In the present specification, the scanning direction (video writing direction) in this line-sequential driving is the vertical direction (longitudinal direction) of the screen.

In the pixel 20 to which the video voltage is thus supplied, the illuminating light from the backlight 3 is modulated by the liquid crystal element 22 and is output as display light. Thereby, the video displaying based on the input video signal Din is carried out in the liquid crystal display device 1. Specifically, in this displaying, the one-frame period is divided into two periods, i.e. the L sub-frame period and the R sub-frame period. The left-eye image based on the left-eye video signal DL is displayed in the L sub-frame period, and the right-eye image based on the right-eye video signal DR is displayed in the R sub-frame period. In this manner, the left-eye image and the right-eye image are alternately displayed and thereby the display driving operation based on time-division driving is carried out.

(2. Eyeglasses Control Operation)

(2-1. Basic Operation)

On the other hand, the eyeglasses controller 42 outputs the predetermined control signal CTL to the shutter eyeglasses 6 in accordance with the timing control by the video signal processor 41. Thereby, the opening and closing operation of the left-eye lens 6L and the right-eye lens 6R is carried out in synchronization with the display switching between the left-eye image and the right-eye image.

Figure 3A:
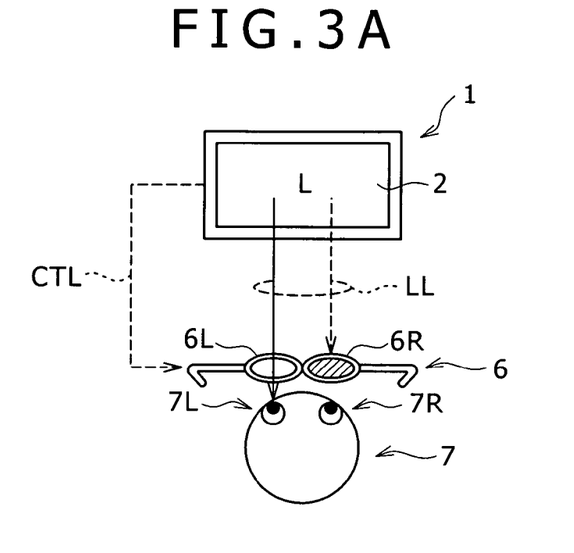
FIGS. 3A and 3B are schematic diagrams showing the outline of stereoscopic video display operation in the display system shown in FIG. 1.
Figure 3B:
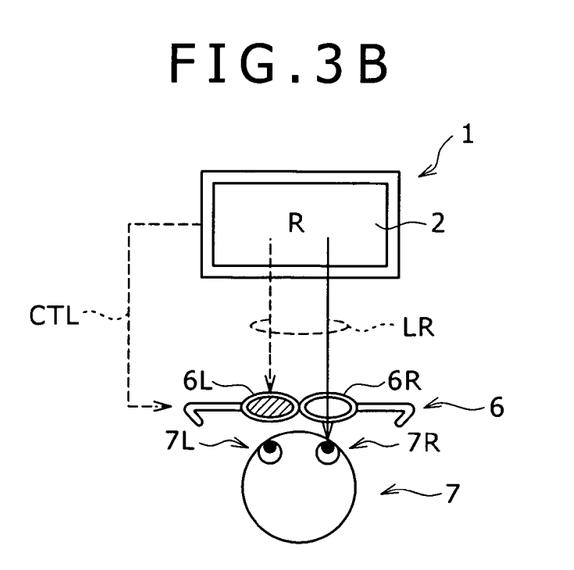

Specifically, as shown in FIG. 3A, in the L sub-frame period, the shutter eyeglasses 6 are controlled by the control signal CTL in such a way that the left-eye lens 6L and the right-eye lens 6R are set to the opened state and the closed state, respectively, to thereby allow display light LL based on the left-eye image to pass through only the left-eye lens 6L. On the other hand, as shown in FIG. 3B, in the R sub-frame period, the shutter eyeglasses 6 are controlled by the control signal CTL in such a way that the right-eye lens 6R and the left-eye lens 6L are set to the opened state and the closed state, respectively, to thereby allow display light LR based on the right-eye image to pass through only the right-eye lens 6R.

As described above, in the liquid crystal display device 1, the left-eye image is displayed in the L sub-frame period and the right-eye image is displayed in the R sub-frame period. In addition, in the shutter eyeglasses 6, the left-eye lens 6L is set to the opened state in the L sub-frame period and the right-eye lens 6R is set to the opened state in the R sub-frame period. A viewer 7 wearing the shutter eyeglasses 6 views the display screen of the liquid crystal display device 1, which allows the viewer 7 to see the left-eye image by the left eye and see the right-eye image by the right eye. Because a parallax exists between these left-eye image and right-eye image, the images are recognized as a stereoscopic image giving a feeling of depth by the viewer 7.

(2-2. Operation of Controlling Timing of Opened-State Period)

In the present embodiment, the eyeglasses controller 42 variably controls the timing (start time) of the opened-state period in the shutter eyeglasses 6 in the above-described eyeglasses control operation. Specifically, in this control, the eyeglasses controller 42 sets (changes) the timing of the opened-state period in the shutter eyeglasses 6 based on e.g. the amount of parallax between consecutive right-eye image and left-eye image on a frame-by-frame basis for example. A detailed description will be made below about the operation of controlling the timing of the opened-state period in the shutter eyeglasses 6.

(Comparative Example)

Figure 4A:
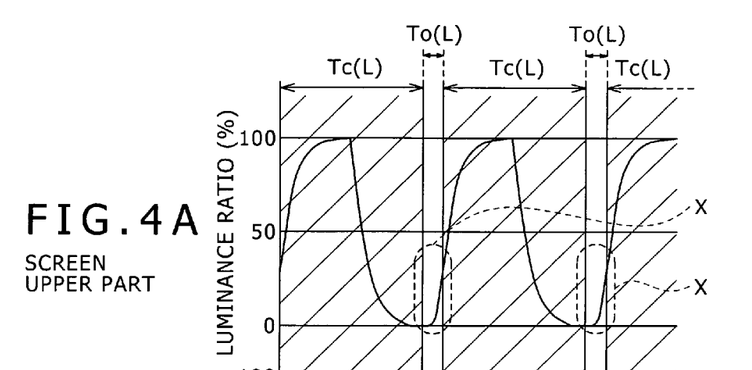
FIGS. 4A to 4C are timing diagrams for explaining eyeglasses control operation according to a comparative example.
Figure 4B:
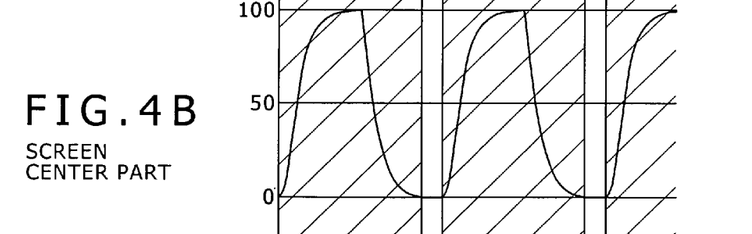
Figure 4C:
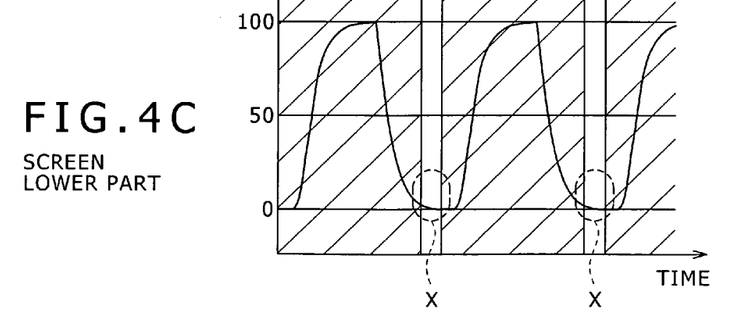

Initially, with reference to FIGS. 4A to 4C, eyeglasses control operation according to a comparative example will be explained. FIGS. 4A to 4C are diagrams showing the luminance ratio at the screen upper part, the screen center part, and the screen lower part, and the opened-state period To(L) and the closed-state period Tc(L) (hatched area) of the left-eye lens in the shutter eyeglasses. In this comparative example, the video voltage corresponding to grayscale 0 is written for the left-eye image and the video voltage corresponding to grayscale 255 is written for the right-eye image at each of the screen upper part, the screen center part, and the screen lower part. In the eyeglasses control operation according to this comparative example, the timing of the opened-state period To(L) is set as a fixed value in advance and cannot be changed after the product shipment.

However, in the case of line-sequentially writing the video signal in the direction from the screen upper part toward the lower part, the writing timing differs depending on the position in the scanning direction. Thus, in the display screen, difference in the time until the luminance reaches the target luminance (desired luminance) occurs depending on the position in the screen. In the comparative example, the timing of the opened-state period To(L) is set as a fixed value in advance based on e.g. the screen center part (specifically, in such a way that the target luminance can be obtained at the screen center part as shown in FIG. 4B). In this case, crosstalk is small at the screen center part but crosstalk (X) occurs at the screen upper part, which is earlier in the writing timing than the screen center part (closer to the scanning start position), and the screen lower part, which is later in the writing timing (closer to the scanning end position). Specifically, at the screen upper part, part of the right-eye image as the next display object is leaked into the currently-displayed left-eye image. At the screen lower part, part of the right-eye image as the previously-displayed image is leaked into the currently-displayed left-eye image.

That is, the crosstalk locally occurs in the display screen if the timing of the opened-state period in the shutter eyeglasses is fixed like in the above-described comparative example. In other words, the optimum timing and duty of the opened-state period in the shutter eyeglasses for suppressing the crosstalk differ depending on the position in the screen. Such crosstalk easily occurs particular if the response speed of the liquid crystal is insufficient and if the contrast in the shutter eyeglasses is insufficient.

(Operation of Changing Timing of Opened-State Period Based on the Amount of Parallax)

Figures 5A, 5B:
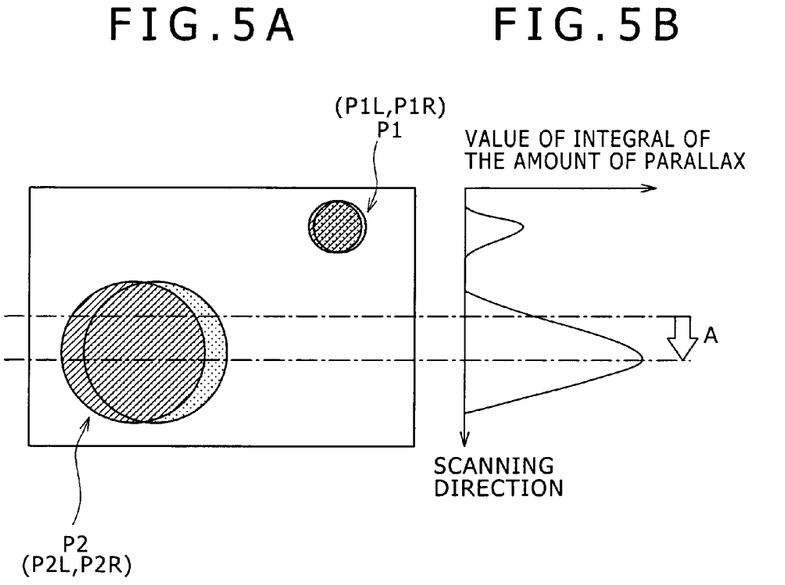
FIG. 5A is a conceptual diagram of a right-eye image and a left-eye image overlapped with each other.
FIG. 5B is a diagram showing the profile of the amount of parallax.

Subsequently, the operation of changing the timing of the opened-state period according to the present embodiment will be described below with reference to FIGS. 5 to 7. FIGS. 5A and 5B are a conceptual diagram showing overlapping of a left-eye image and a right-eye image displayed in a one-frame period and a diagram showing the profile of the amount of parallax, respectively. The following description will be made by taking the state in which the timing of the opened-state period is originally set based on the screen center part as an example of the initial state employed before timing change.

In the present embodiment, the eyeglasses controller 42 changes the timing of the opened-state period in the shutter eyeglasses 6 based on e.g. the amount of parallax between consecutive right-eye image and left-eye image on a frame-by-frame basis for example. Specifically, based on the profile of the amount of parallax detected along the screen scanning direction, the eyeglasses controller 42 adjusts the timing of the opened-state period in such a way that crosstalk will be the smallest at the position of the maximum amount of parallax. For example, if the timing is originally set based on the screen center part, the timing is changed as follows. Specifically, the timing is changed to an earlier timing if the position at which the amount of parallax is the largest is closer to the scanning start position than the screen center part. In contrast, the timing is changed to a later timing if the position is closer to the scanning end position than the screen center part.

For example, as shown in FIG. 5A, for stereoscopic video displaying, a picture P1 (left-eye picture P1L, right-eye picture P1R) is displayed at the screen upper part and a picture P2 (left-eye picture P2L, right-eye picture P2R) is displayed at the screen center and lower parts. In this case, the profile of the amount of parallax shown in FIG. 5B is obtained for example. As a result, the amount of parallax at the part corresponding to the picture P2 in the screen (the amount of parallax between the picture P2L and the picture P2R) is the largest. Therefore, the timing of the opened-state period is so adjusted that crosstalk will be the smallest at the position indicated by A in FIG. 5B for example.

As above, a left-eye image and a right-eye image displayed in a one-frame period in a time-division manner have parallax therebetween, and the amount of parallax differs from position to position in the screen depending on the displayed pictures. Furthermore, crosstalk is more conspicuous at a position of larger parallax than at a position of smaller parallax. Therefore, by changing the timing of the opened-state period on the basis of the position of the maximum amount of parallax based on the profile of the amount of parallax between the left-eye image and the right-eye image as described above, the crosstalk can be effectively suppressed at the place where the crosstalk is more conspicuous. That is, through the optimization of the timing of the opened-state period in the shutter eyeglasses 6, the impression of the whole of the display screen can be made favorable.

The above-described detection of the profile of the amount of parallax between the left-eye image and the right-eye image can be carried out by the video signal processor 41 for example. In this case, for example, the amount of parallax is detected by performing matching of the corresponding points between the left-eye image and the right-eye image.

As described above, in the present embodiment, the timing of the opened-state period in the shutter eyeglasses 6 is changed in the eyeglasses controller 42 based on the amount of parallax between the left-eye image and the right-eye image. Thus, the timing of the opened-state period can be optimized depending on the pictures in the displayed image and so on. Consequently, the crosstalk can be effectively suppressed depending on the content of the image.

<Second Embodiment>

Next, a display system according to a second embodiment of the present invention will be described below. The same components as those in the above-described first embodiment are given the same numerals and the description thereof is accordingly omitted.

The display system of the present embodiment has the same components as those in the display system of the above-described first embodiment. However, the operation of controlling the timing of the opened-state period, carried out by the eyeglasses controller 42, is different. Specifically, in the above-described first embodiment, the timing of the opened-state period is changed based on the amount of parallax between the left-eye image and the right-eye image. On the other hand, in the present embodiment, the timing is changed based on the contrast between the left-eye image and the right-eye image (hereinafter, referred to as the LR contrast).

Specifically, based on the profile of the LR contrast detected along the screen scanning direction, the timing of the opened-state period is so adjusted that crosstalk will be the smallest at the position of the maximum LR contrast. For example, if the timing is originally set based on the screen center part, the timing is changed as follows. Specifically, the timing is changed to an earlier timing if the position at which the LR contrast is the highest is closer to the scanning start position than the screen center part. In contrast, the timing is changed to a later timing if the position is closer to the scanning end position than the screen center part. The LR contrast can be detected by the video signal processor 41 for example. Specifically, in this detection, the LR contrast (CR) is calculated from the grayscales of the left-eye image and the right-eye image at the same pixel. For example, this CR is calculated by using Equation (A) or Equation (B) shown below if the larger grayscale of the left-eye image and the right-eye image is defined as $G_{high}$ and the smaller grayscale is defined as $G_{low}$. However, the calculation formula for the LR contrast is not limited to Equations (A) and (B) but any of various calculation formulas can be used.

$$CR = (G_{high} - G_{low})/(G_{high} + G_{low}) \quad (A)$$

$$CR = G_{high}/G_{low} \quad (B)$$

In the screen, at a position of higher LR contrast, it takes a longer time for the luminance to reach the target luminance compared with a position of lower LR contrast, and crosstalk easily occurs particularly if the response speed of the liquid crystal is insufficient. Therefore, also in the case of utilizing the LR contrast, the crosstalk can be suppressed more effectively by changing the timing of the opened-state period based on the position at which the LR contrast is the highest in the screen scanning direction, similarly to the timing control based on the amount of parallax in the above-described first embodiment.

Figure 6A:
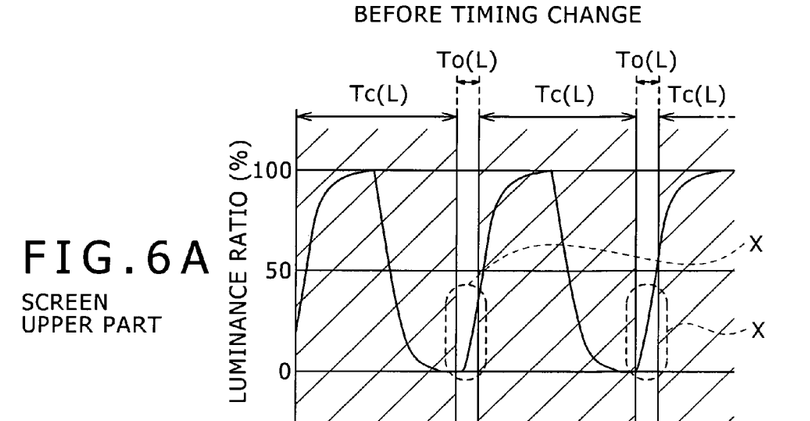
FIGS. 6A to 6C are timing diagrams for explaining eyeglasses control operation in the display system shown in FIG. 1, before timing change.
Figure 6B:
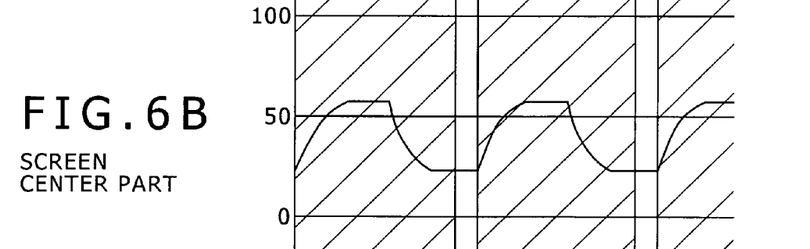
Figure 6C:
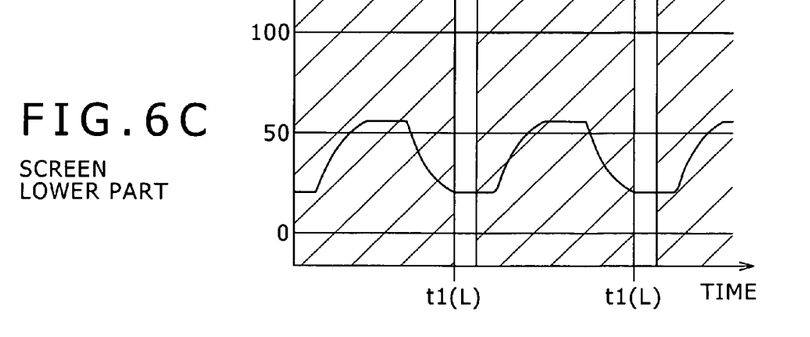
Figure 7A:
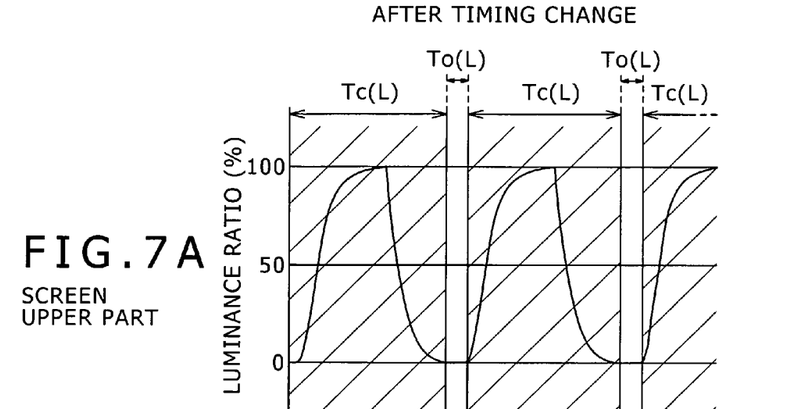
FIGS. 7A to 7C are timing diagrams for explaining the eyeglasses control operation in the display system shown in FIG. 1, after timing change.
Figure 7B:
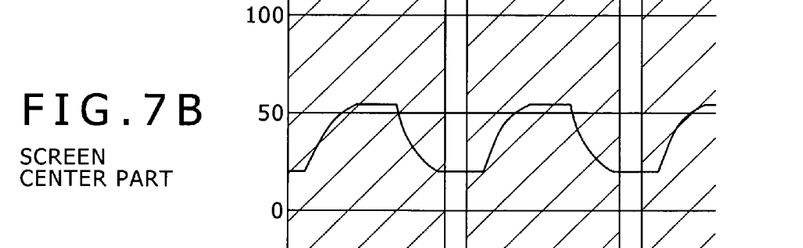
Figure 7C:
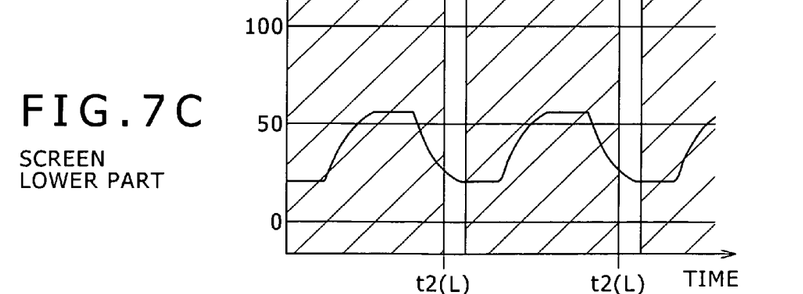

As one example, FIGS. 6A to 6C show the luminance ratio at the screen upper part, the screen center part, and the screen lower part, and the opened-state period To(L) and the closed-state period Tc(L) (hatched area) of the left-eye lens 6L in the shutter eyeglasses 6, employed before timing change. Furthermore, FIGS. 7A to 7C show the luminance ratio at the screen upper part, the screen center part, and the screen lower part, and the opened-state period To(L) and the closed-state period Tc(L) (hatched area) of the left-eye lens 6L in the shutter eyeglasses 6, employed after timing change. In these examples, the LR contrast is higher at the screen upper part than at the screen center part and the screen lower part. Specifically, for example, at the screen upper part, the video voltage corresponding to grayscale 0 is written for the left-eye image and the video voltage corresponding to grayscale 255 is written for the right-eye image. At the screen center and lower parts, the video voltage corresponding to grayscale 128 is written for the left-eye image and the video voltage corresponding to grayscale 192 is written for the right-eye image.

As shown in FIGS. 6A to 6C, if the timing of the opened-state period To(L) is set as a timing t1(L) designed based on the screen center part and the LR contrast is the highest at the screen upper part, crosstalk X occurs more easily (is more conspicuous) at the screen upper part. To address such a case, as shown in FIGS. 7A to 7C, the timing is changed to a timing t2(L) earlier than the timing t1(L) to thereby suppress the crosstalk at the screen upper part. By this timing change, the crosstalk becomes larger than that before the change at the screen lower part depending on the case. However, this crosstalk is hardly conspicuous because the LR contrast is lower at the screen lower part than at the screen upper part. Therefore, the crosstalk can be effectively suppressed by changing the timing of the opened-state period in the shutter eyeglasses 6 based on the LR contrast.

As described above, in the present embodiment, the timing of the opened-state period in the shutter eyeglasses 6 is changed based on the contrast between the left-eye image and the right-eye image. Thus, the timing of the opened-state period can be optimized depending on the pictures in the displayed image and so on. Consequently, the same advantageous effects as those by the above-described first embodiment can be achieved.

<Modification Example 1>

Next, a modification example of the above-described second embodiment (modification example 1) will be described below. The same components as those in the above-described first and second embodiments are given the same numerals and the description thereof is accordingly omitted.

In the above-described second embodiment, the timing of the opened-state period in the shutter eyeglasses 6 is changed in the eyeglasses controller 42 based on the LR contrast. On the other hand, in the present modification example, the duty of the opened-state period is changed based on the LR contrast. Specifically, a statistic, such as the average or the sum, of the LR contrast in the whole of one screen is detected and the duty of the opened-state period is changed depending on the detected statistic. The statistic of the LR contrast can be detected by the video signal processor 41 for example.

Figure 8A:
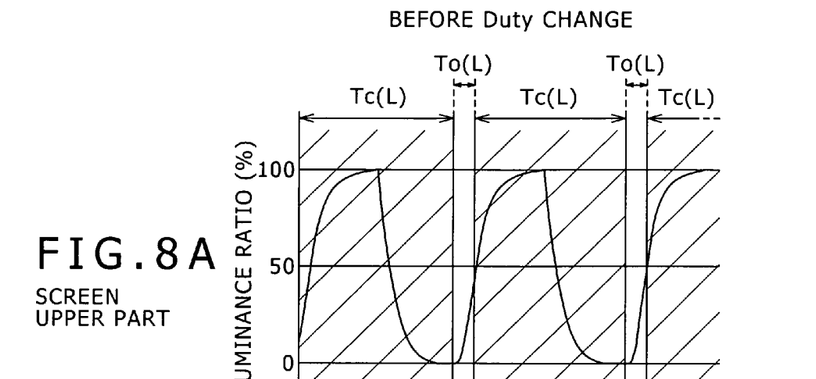
FIGS. 8A to 8C are timing diagrams for explaining eyeglasses control operation in a display system according to a second embodiment of the present invention, before duty change.
Figure 8B:
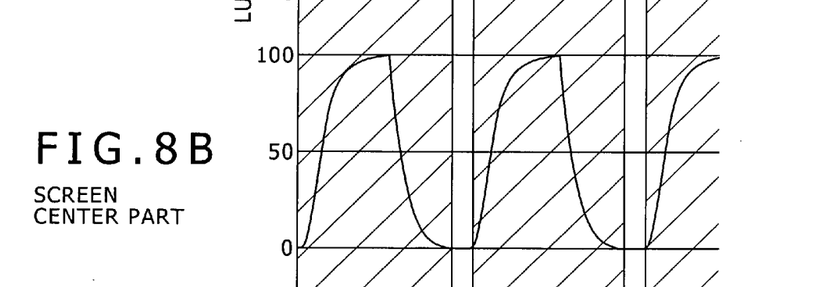
Figure 8C:
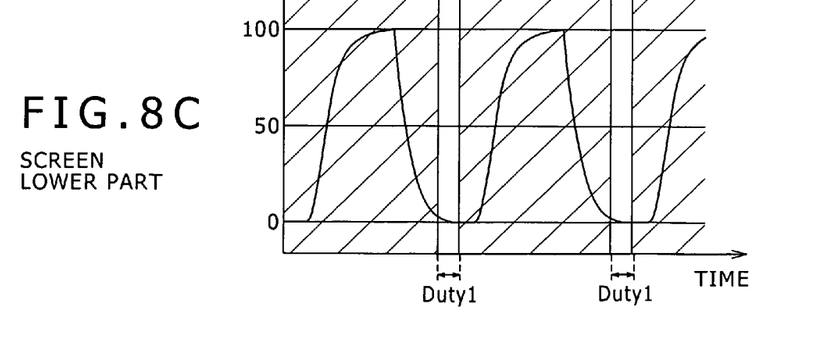
Figure 9A:
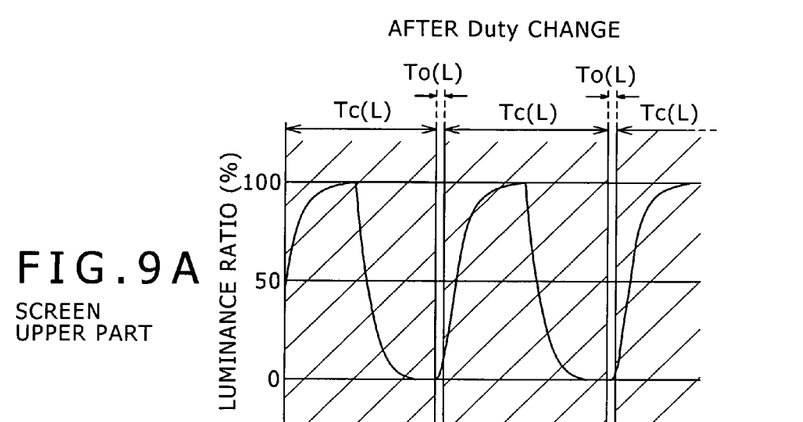
FIGS. 9A to 9C are timing diagrams for explaining the eyeglasses control operation in the display system according to the second embodiment of the present invention, after duty change.
Figure 9B:
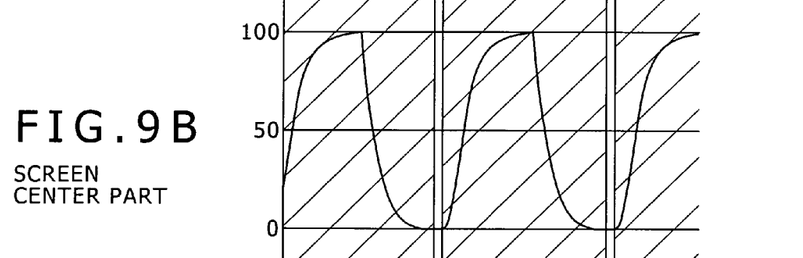
Figure 9C:
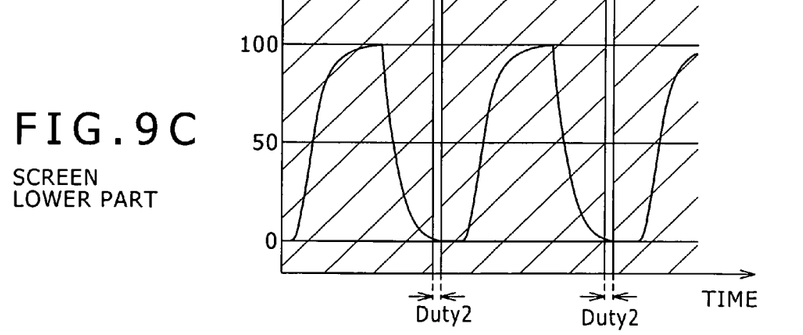

As one example, FIGS. 8A to 8C show the luminance ratio at the screen upper part, the screen center part, and the screen lower part, and the opened-state period To(L) and the closed-state period Tc(L) (hatched area) of the left-eye lens 6L in the shutter eyeglasses 6, employed before duty change. Furthermore, FIGS. 9A to 9C show the luminance ratio at the screen upper part, the screen center part, and the screen lower part, and the opened-state period To(L) and the closed-state period Tc(L) (hatched area) of the left-eye lens 6L in the shutter eyeglasses 6, employed after duty change. In these examples, the LR contrast is high over the entire screen. Specifically, for example, the video voltage corresponding to grayscale 0 is written for the left-eye image and the video voltage corresponding to grayscale 255 is written for the right-eye image at each of the screen upper part, the screen center part, and the screen lower part.

If the LR contrast is particularly high over the entire screen in this manner, it is preferable to shorten the duty of the opened-state period. Specifically, if the duty of the opened-state period is originally set to a predetermined length (Duty 1) and an image in which the LR contrast is high over the entire screen is to be displayed (FIGS. 8A to 8C), the duty of the opened-state period is shortened as shown in FIGS. 9A to 9C (Duty 2). Thereby, crosstalk can be suppressed in the entire screen.

The above description of modification example 1 is made by taking as an example the case in which the duty of the opened-state period is shortened if the LR contrast is high over the entire screen. However, in contrast, if the LR contrast is low over the entire screen, the duty of the opened-state period may be changed to a longer duty. Because the crosstalk is less conspicuous if the LR contrast is low, it is also possible to change the duty to a longer duty and correspondingly enhance the display luminance. That is, particularly if the LR contrast is equivalent over the entire screen, it is preferable to change the duty like in the present modification example. If the LR contrast differs depending on the position in the screen, it is preferable to change the timing of the opened-state period like in the above-described second embodiment. Furthermore, it is also possible to change both of the timing and duty of the opened-state period to thereby ensure the desired luminance with suppression of the crosstalk. Moreover, the opened-state period may be optimized by setting the timing and the duty by using the amount of parallax in the above-described first embodiment and the LR contrast in the above-described second embodiment and modification example 1 in a complex manner.

As described above, the timing and/or duty of the opened-state period may be changed through detection of the amount of lateral parallax or the contrast on a frame-by-frame basis. However, the timing and/or duty do not necessarily need to be changed on a frame-by-frame basis. For example, the timing and/or duty may be changed for each of groups of plural consecutive frames having high correlation (having similar pictures).

In the above-described modification example 1, the duty of the opened-state period is changed based on the LR contrast. However, the duty change is not limited to the LR contrast but the duty may be changed based on the above-described amount of parallax. Also in the case of using the amount of parallax, a statistic (average, sum) in the entire screen may be obtained and the duty of the opened-state period may be changed based on this statistic similarly to the case of the LR contrast. Specifically, the duty is so changed as to be extended if the statistic of the amount of parallax is smaller and be shortened if the statistic is larger.

<Modification Examples 2 and 3>

Next, modification examples of the embodiment of the present invention (modification examples 2 and 3) will be described below. In the following description, the same components as those in the above-described first and second embodiments are given the same numerals and the description thereof is accordingly omitted. In the above-described first and second embodiments and modification example 1, the timing or duty of the opened-state period in the shutter eyeglasses 6 is changed based on the amount of parallax or the LR contrast about the image as the display object depending on the content of the image (pictures and so on). However, the change section is not limited thereto.

(Modification Example 2)

For example, it is possible to provide a mechanism that can change the timing and duty of the opened-state period based on an input signal from the external, specifically an input signal input in response to a command by the viewer of the displayed image (user) or the like.

In this case, e.g. a configuration in which the timing and the duty can be arbitrarily changed may be employed. Alternatively, a configuration may be employed in which several kinds of preset modes (normal mode, dynamic mode, and so on) are designed in advance and the user can select one mode from these preset modes. Furthermore, an image for adjustment may be displayed at the time of this change (selection) of the timing and the duty.

Changing the duty of the opened-state period involves trade-off between the brightness and crosstalk. Furthermore, because the crosstalk differs depending on the grayscales of the right-eye image and the left-eye image, it is preferable for the image for adjustment to include various grayscale combinations. In addition, in changing the timing of the opened-state period, it is preferable that the user can recognize which position in the screen this timing fits in. Thus, it is preferable to employ, as the image for adjustment, an image in which no change exists in the screen scanning direction (vertical direction, longitudinal direction) or an image in which a regular pattern is repeated in the screen scanning direction.

Figure 10A:
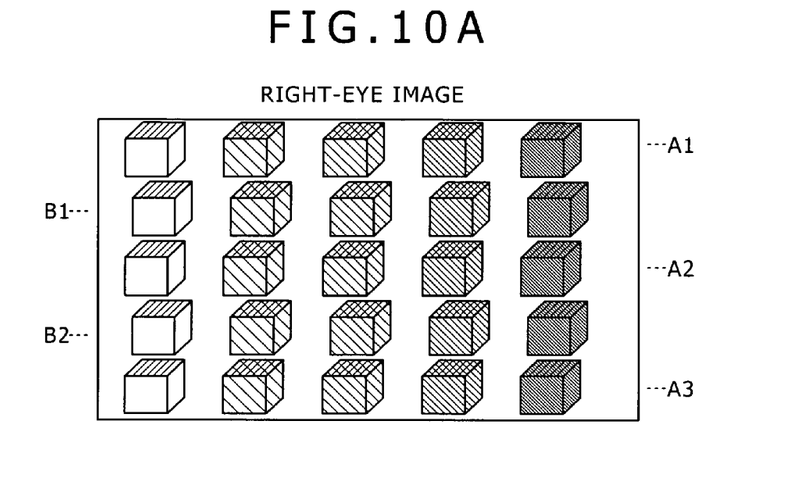
FIGS. 10A and 10B are diagrams showing one example of an image for adjustment according to a modification example 2.
Figure 10B:
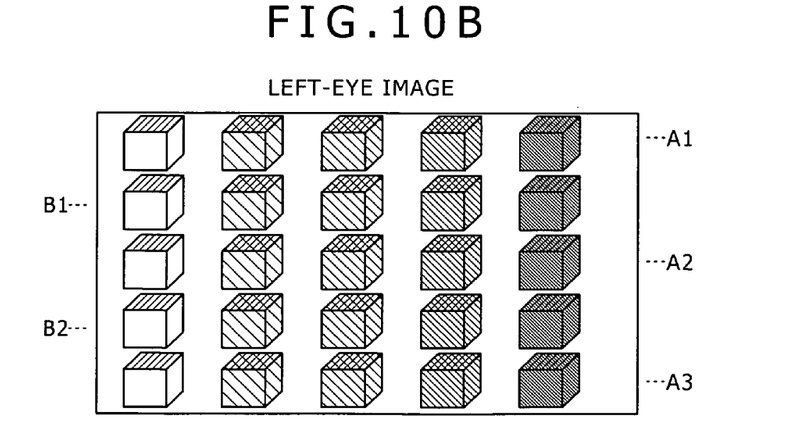

One example of the image for adjustment meeting this requirement is shown in FIGS. 10A and 10B. This image for adjustment has e.g. a configuration in which plural cubes are two-dimensionally arranged. In this configuration, a parallax is set between the right-eye image and the left-eye image in such a way that the odd-numbered rows (A1, A2, A3) appear to leap toward the viewer side (front side) and the even-numbered rows (B1, B2) appear to leap toward the back side. In addition, cubes of different grayscales are arranged along the horizontal direction (lateral direction). Thereby, various grayscale combinations are realized. On the other hand, cubes of the same grayscale are arranged along the screen scanning direction (vertical direction, longitudinal direction), which makes it easier to recognize which position in the screen the timing fits in.

As described above, by allowing change in the timing and duty of the opened-state period based on an input signal from the external, the timing and duty of the opened-state period can be changed responding to a variety of user's demands. For example, the balance between the brightness and crosstalk, which are in a trade-off relationship, can be adjusted by changing the duty, and the timing of the opened-state period can be fitted to an arbitrary position in the screen. Furthermore, by displaying the above-described image for adjustment at the time of the change in the timing and the duty, the user can visually determine the desired timing and duty, which facilitates the change. Thus, crosstalk can be suppressed depending on the content of the image and the status of use.

(Modification Example 3)

A configuration may be employed in which the eyeglasses controller 42 changes the duty of the opened-state period in the shutter eyeglasses 6 in response to change in the panel temperature. Specifically, the eyeglasses controller 42 changes the duty to a shorter duty if the panel temperature is lower, and changes the duty to a longer duty if the panel temperature is higher. This is because the response speed of the liquid crystal is lower and thus crosstalk occurs more easily (is more conspicuous) when the panel temperature is lower whereas the response speed of the liquid crystal is higher and thus crosstalk occurs less easily (is less conspicuous) when the panel temperature is higher. The liquid crystal panel is cold immediately after its power supply is turned to the on-state, and the panel temperature gradually rises over time. Therefore, it is effective to change the duty in response to the temperature change. However, in practice, it is frequently difficult to directly measure the panel temperature during the use of the device. Thus, the temperature in the device (temperature in the apparatus) is measured and the duty is changed based on this temperature in the device.

(Modification Example 4)

Figure 11A:
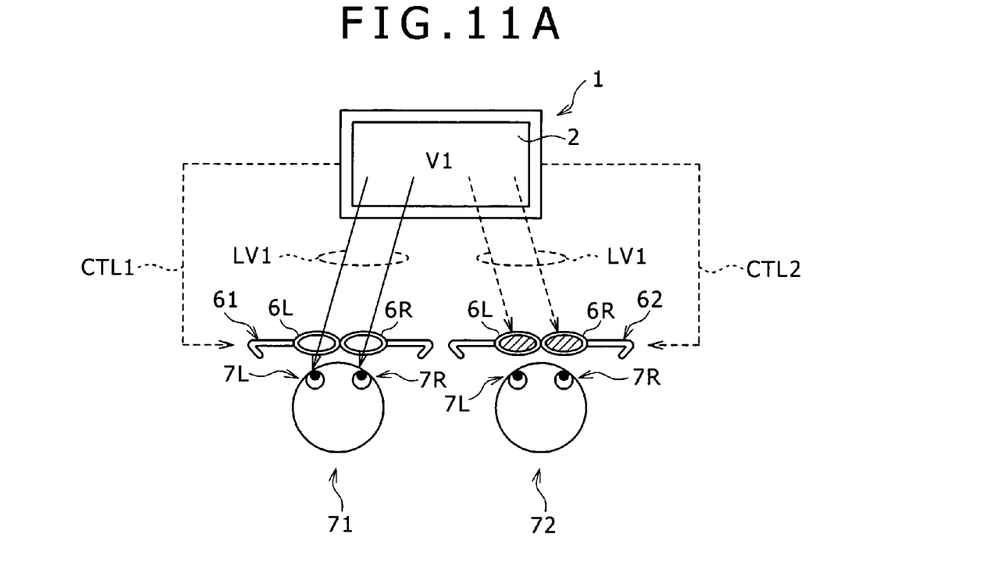
FIGS. 11A and 11B are schematic diagrams showing the outline of video display operation in a multi-view system according to a modification example 4.
Figure 11B:
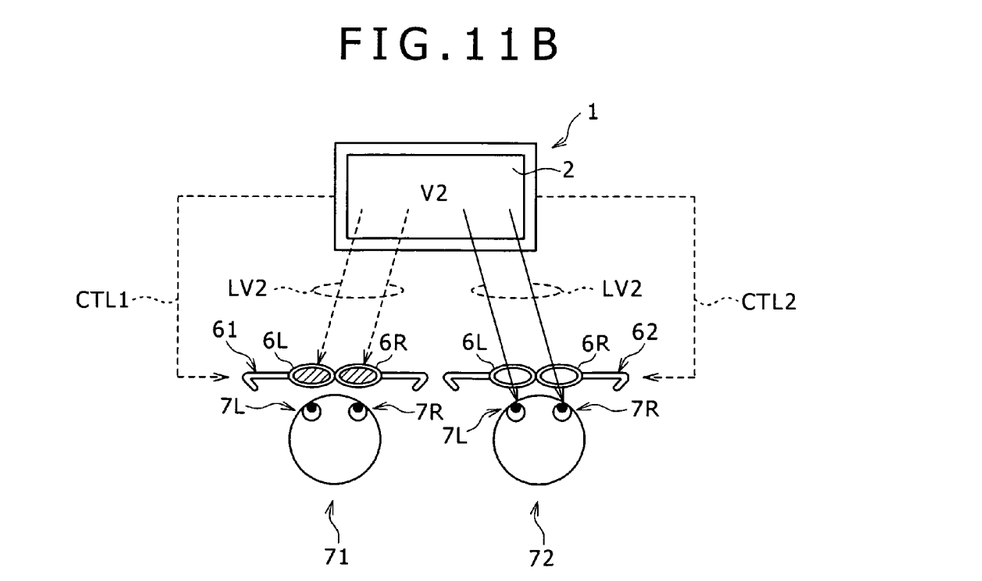

FIG. 11 is a diagram schematically showing the outline of video display operation in a display system (multi-view system) according to modification example 4 of the embodiment of the present invention. In the present modification example, instead of the stereoscopic video display operation described thus far, video display operation that allows plural (two, in this example) images different from each other to be individually displayed for plural viewers (two viewers, in this example) is carried out.

In the multi-view system of the present modification example, a first image based on a first video signal corresponding to the first viewer and a second image based on a second video signal corresponding to the second viewer are alternately displayed in a time-division manner. That is, in contrast to the above-described systems, in which the left-eye image and the right-eye image each corresponding to a respective one of the left-eye lens 6L and the right-eye lens 6R in the shutter eyeglasses 6 are displayed, plural images each corresponding to a respective one of the viewers (users) are displayed in the present modification example.

Specifically, as shown in FIG. 11A, in the display period of a first image V1, by a control signal CTL1, both of the right-eye lens 6R and the left-eye lens 6L are set to the opened state in shutter eyeglasses 61 used by a viewer 71. Furthermore, by a control signal CTL2, both of the right-eye lens 6R and the left-eye lens 6L are set to the closed state in shutter eyeglasses 62 used by a viewer 72. That is, the shutter eyeglasses 61 of the viewer 71 transmit display light LV1 based on the first image V1, whereas the shutter eyeglasses 62 of the viewer 72 block this display light LV1.

On the other hand, as shown in FIG. 11B, in the display period of a second image V2, by the control signal CTL2, both of the right-eye lens 6R and the left-eye lens 6L are set to the opened state in the shutter eyeglasses 62 used by the viewer 72. Furthermore, by the control signal CTL1, both of the right-eye lens 6R and the left-eye lens 6L are set to the closed state in the shutter eyeglasses 61 used by the viewer 71. That is, the shutter eyeglasses 62 of the viewer transmit display light LV2 based on the second image V2, whereas the shutter eyeglasses 61 of the viewer 71 block this display light LV2.

These states are alternately repeated in a time-division manner, which allows two viewers 71 and 72 to individually view the images different from each other (images V1 and V2).

Also in the above-described multi-view system, the same advantageous effects as those by the above-described embodiments and so on can be achieved by changing the timing and duty of the respective opened-state periods in the shutter eyeglasses 61 and 62, like those described in the above embodiments and so on.

Although two viewers individually view two images different from each other in the present modification example, the concept of the modification example can be applied also to the case in which three or more viewers individually view three or more images different from each other. Furthermore, the number of images and the number of pairs of shutter eyeglasses do not necessarily need to be identical to each other. Specifically, plural pairs of shutter eyeglasses that carry out opening and closing operation in matching with certain one image may be prepared, and plural viewers may view this one image.

Although the embodiments of the present invention and the modification examples have been described above, the present invention is not limited to these embodiments and so on but various changes might be incorporated therein. For example, in the above-described embodiments and so on, the liquid crystal display device employing the liquid crystal element is taken as one example of the display device. However, the embodiments of the present invention and so on can be applied also to other kinds of display devices. For example, they can be applied also to display devices based on e.g. plasma display panels (PDP) and organic electro luminescence (EL) displays.

Furthermore, the description of the above embodiments and so on is made by employing the state in which the timing and so on is set based on the screen center part as the initial state employed before change in the timing (or the duty). However, the present invention is not limited to the change from such an initial state. That is, the embodiments of the present invention and so on can be applied to the case in which the timing and so on is originally set based on an arbitrary position on the screen.

Moreover, the series of processing described for the above embodiments and so on can be executed by hardware, or alternatively can be executed by software. In the case of executing the series of processing by software, the program forming the software is installed in a general-purpose computer or the like. Such a program may be recorded in a built-in recording medium in the computer in advance.

It should be understood by those skilled in the art that various modifications, combinations, sub-combinations and alterations may occur depending on design requirements and other factors insofar as they are within the scope of the appended claims or the equivalents thereof.

What is claimed is:

1. A display device, comprising:
    a display unit configured to display images each corresponding to a respective one of a plurality of shutter mechanisms that carry out opening and closing operation at timings different from each other, in such a manner as to switch the images in a time-division manner; and
    a shutter controller configured to set a respective one of the shutter mechanisms to an opened state in a display period of the image corresponding to the respective one of the shutter mechanisms, and variably control at least one of start time and length of an opened-state period of the shutter mechanism,
    wherein the plurality of images are a left-eye image and a right-eye image having parallax, further comprising a video processor configured to detect at least one of an amount of parallax and contrast between the left-eye image and the right-eye image,
wherein
the shutter controller sets at least one of the start time and length of the opened-state period based on at least one of the amount of parallax and the contrast,
the display unit performs displaying by writing a video signal while line-sequentially scanning a display screen,
the video processor detects a profile of the amount of parallax along direction of the scanning,
the shutter controller changes the start time depending on the profile of the amount of parallax, and
the shutter controller changes the start time set based on a first position on the screen to a time earlier than a previous start time if a position at which the amount of parallax is largest is closer to a scanning start position than the first position, and changes the start time to a time later than the previous start time if the position at which the amount of parallax is largest is closer to a scanning end position than the first position.

2. The display device according to claim 1, wherein
the video processor calculates a predetermined mathematical value of the amount of parallax in whole of one screen, and
the shutter controller changes the length of the opened-state period depending on the calculated predetermined mathematical value of the amount of parallax.

3. The display device according to claim 2, wherein
the shutter controller changes the length of the opened-state period to a shorter length if the calculated predetermined mathematical value of the amount of parallax is larger, and changes the length of the opened-state period to a longer length if the calculated predetermined mathematical value of the amount of parallax is smaller.

4. A display device, comprising:
a display unit configured to display images each corresponding to a respective one of a plurality of shutter mechanisms that carry out opening and closing operation at timings different from each other, in such a manner as to switch the images in a time-division manner; and
a shutter controller configured to set a respective one of the shutter mechanisms to an opened state in a display period of the image corresponding to the respective one of the shutter mechanisms, and variably control at least one of start time and length of an opened-state period of the shutter mechanism,
wherein the plurality of images are a left-eye image and a right-eye image having parallax,
further comprising a video processor configured to detect at least one of an amount of parallax and contrast between the left-eye image and the right-eye image,
wherein
the shutter controller sets at least one of the start time and length of the opened-state period based on at least one of the amount of parallax and the contrast,
the display unit performs displaying by writing a video signal while line-sequentially scanning a display screen,
the video processor detects a profile of the contrast along direction of the scanning,
the shutter controller changes the start time depending on the profile of the contrast, and
the shutter controller changes the start time set based on a first position on the screen to a time earlier than a previous start time if a position at which the contrast is highest is closer to a scanning start position than the first position, and changes the start time to a time later than the previous start time if the position at which the contrast is highest is closer to a scanning end position than the first position.

5. The display device according to claim 1, wherein the shutter controller changes the length of the opened-state period in response to change in temperature in the display device.

6. The display device according to claim 5, wherein the shutter controller changes the length of the opened-state period to a shorter length if the temperature in the display device is lower, and changes the length of the opened-state period to a longer length if the temperature in the display device is higher.

7. The display device according to claim 1, wherein the video processor is configured to detect the amount of parallax between the left-eye image and the right-eye image by performing a matching process involving corresponding points between the left-eye image and the right-eye image.

8. The display device according to claim 4, wherein
the video processor calculates a predetermined mathematical value of the amount of parallax in whole of one screen, and
the shutter controller changes the length of the opened-state period depending on the calculated predetermined mathematical value of the amount of parallax.

9. The display device according to claim 8, wherein
the shutter controller changes the length of the opened-state period to a shorter length if the calculated predetermined mathematical value of the amount of parallax is larger, and changes the length of the opened-state period to a longer length if the calculated predetermined mathematical value of the amount of parallax is smaller.

10. The display device according to claim 4, wherein the shutter controller changes the length of the opened-state period in response to change in temperature in the display device.

11. The display device according to claim 10, wherein the shutter controller changes the length of the opened-state period to a shorter length if the temperature in the display device is lower, and changes the length of the opened-state period to a longer length if the temperature in the display device is higher.

12. The display device according to claim 4, wherein the video processor is configured to detect the amount of parallax between the left-eye image and the right-eye image by performing a matching process involving corresponding points between the left-eye image and the right-eye image.

* * * * *